United States Patent
Crabill et al.

(10) Patent No.: US 7,764,032 B2
(45) Date of Patent: Jul. 27, 2010

(54) ELECTRONIC COMMUTATION METHOD AND RELATED APPARATUS

(76) Inventors: Monty L. Crabill, 11630 Marquart Rd., New Carlisle, OH (US) 45344; Robert J. Disser, 804 Westminster Pl., Dayton, OH (US) 45419

( * ) Notice: Subject to any disclaimer, the term of this patent is extended or adjusted under 35 U.S.C. 154(b) by 0 days.

(21) Appl. No.: 12/262,827

(22) Filed: Oct. 31, 2008

(65) Prior Publication Data

US 2009/0051305 A1 Feb. 26, 2009

Related U.S. Application Data

(63) Continuation of application No. 11/212,952, filed on Aug. 26, 2005, now Pat. No. 7,573,224.

(51) Int. Cl.
*H02P 6/04* (2006.01)
(52) U.S. Cl. .............................. 318/400.1; 318/400.01; 318/400.11
(58) Field of Classification Search ............... 318/400.1, 318/400.01, 400.11, 727, 400.08, 439; 702/188
See application file for complete search history.

(56) References Cited

U.S. PATENT DOCUMENTS

| | | | |
|---|---|---|---|
| 5,721,475 A | 2/1998 | Fincher | |
| 5,869,946 A | 2/1999 | Carobolante | |
| 5,929,589 A | 7/1999 | Suzuki et al. | |
| 6,002,226 A | 12/1999 | Collier-Hallman et al. | |
| 6,232,731 B1 | 5/2001 | Chapman | |
| 6,252,371 B1 * | 6/2001 | Kubozuka et al. | 318/696 |
| 6,448,676 B1 | 9/2002 | Kershaw et al. | |
| 6,448,724 B1 | 9/2002 | Kleinau et al. | |
| 6,586,898 B2 | 7/2003 | King et al. | |
| 6,771,035 B2 | 8/2004 | Heidrich | |
| 6,809,484 B2 | 10/2004 | Makaran et al. | |
| 6,831,431 B1 | 12/2004 | Dieterle et al. | |
| 6,876,165 B1 | 4/2005 | Rappenecker et al. | |
| 6,956,349 B2 | 10/2005 | Tani et al. | |

* cited by examiner

*Primary Examiner*—Karen Masih
(74) *Attorney, Agent, or Firm*—Dickinson Wright PLLC; William H. Honaker

(57) ABSTRACT

A method and apparatus for electronic commutation of a pulse width modulation (PWM) controlled motor involves temporarily increasing the frequency of one or more PWM drive signals applied to the motor upon the occurrence of an asynchronous commutation event.

8 Claims, 9 Drawing Sheets

ELECTRONIC COMMUTATION METHOD AND RELATED APPARATUS

TECHNICAL FIELD

The present application relates generally to electronic commutation, and more particularly to a method and apparatus to improve electronic commutation of a pulse width modulation (PWM) controlled electric motor.

BACKGROUND

Electronic commutation of electric motor phase windings is used to control the torque produced and the resulting rotation of the motor shaft. Torque about the rotor shaft is produced from the interaction of magnetic force fields generated by a magnetic rotor attached to the motor shaft and current flowing through the stator phase windings. Maximum torque occurs when the angle between stator and rotor magnetic field vectors is 90 electrical degrees and decreases as the vectors align during rotation.

To control shaft rotation, the stator phase windings can be energized in a sequence defined by the angular position of the magnetic rotor with respect to the stator phase windings. Angular position of the magnetic rotor can be detected using three stationary Hall effect sensors positioned on a radius about the shaft and a multi-pole ring magnet aligned with the rotor poles attached to the shaft. The Hall effect sensor outputs can collectively be used to determine sequential commutation states during rotation of the magnetic rotor.

For example, in a stator having three phase windings, a six-step commutation method may produce six possible stator magnetic field vectors over 360 electrical degrees. Each commutation state may represent 60 electrical degrees with one phase winding connected to a positive voltage, a second phase winding connected to a negative voltage and a third phase winding not connected. A commutation event may be defined as occurring when the rotor moves from a position associated with one commutation state to a position associated with a next commutation state, as determined by a change in output from the Hall effect sensors due to rotation of the rotor ring magnet. For a new commutation state, the stator phase windings may be energized with the correct voltage polarities. In a PWM motor control system, phase winding voltage polarity and average value are typically controlled by comparison of a duty cycle value with a dual-sloped linear ramp function driven by a controller. The comparison output is valid for the time the dual-sloped linear ramp function value exceeds the duty cycle value.

Each phase winding can be driven by a complementary pair of electronic switching devices controlled by PWM drive signals generated by the controller. For each phase winding, three possible voltage connections can be made using the electronic switching device pair: positive voltage when the HI device is powered on, negative voltage when the LO device is powered on and no voltage when both devices are powered off. Simultaneously powering on the HI and LO devices of a phase winding may result in a short circuit, allowing potentially destructive shoot through currents to flow from the positive to negative voltage supplies through the electronic switching device pair. Shoot through currents can be avoided by incurring a dead-time between powering off one electronic switching device and powering on the other electronic switching device.

The timing diagram of FIG. 1 illustrates an ideal commutation response to a commutation event 10 represented by the transition from a first commutation state (State 1) to a second commutation state (State 2) for a three phase motor with a stator having three similar phase windings A, B and C. Prior to commutation event 10, the phase A terminal is connected to positive voltage, the phase B terminal is connected to negative voltage and the phase C terminal is unconnected. Upon duty cycle completion, the phase A terminal is momentarily disconnected to incur dead-time 12 to avoid shoot through current. The phase A terminal is then connected to negative voltage to allow freewheeling load current to circulate. A resultant voltage will be impressed across the phase A and phase B terminals in direct proportion to the PWM duty cycle.

Upon occurrence of commutation event 10, new voltage connections are required. The phase A terminal is disconnected, the phase B terminal remains connected to negative voltage and the phase C terminal is connected to positive voltage. A new PWM period or cycle is initiated and the average resultant voltage impressed across the phase C and phase B terminals would be equal to the average resultant voltage impressed across the phase A and phase B terminals for the previously completed PWM cycle prior to the commutation event. Although this ideal embodiment is technically feasible, many hardware implementations are incapable of implementing this ideal operation.

In some hardware implementations incapable of ideal operation, phase winding voltage polarities for a new commutation state cannot take effect until the current or ongoing PWM drive signal cycle is complete, thus delaying commutation. A six-step commutation method cannot maintain the angle between the rotor and stator magnetic fields at 90 electrical degrees for maximum torque. The actual angle varies from 60 to 120 electrical degrees. The commutation event is critical for its angular (time) accuracy and any deviation will cause torque ripple and speed variations.

The timing diagram of FIG. 2 illustrates typical delayed commutation from State 1 to State 2 due to hardware limitations. After commutation event 10, the voltage connections are changed only after initiation of the new PWM drive signal cycle at 14. While common, this method results in a delay of up to one PWM drive signal cycle.

The timing diagram of FIG. 3 illustrates a decreased resultant average voltage applied across the phase B and phase C terminals in response to commutation event 10. After commutation event 10, the ongoing PWM drive signal being applied to the phase A terminal is steered to the phase C terminal as shown. However, this technique results in application of an incorrect duty cycle to the new commutation state.

These delays (FIG. 2) and incorrect duty cycles (FIG. 3) in response to a change in commutation states create torque ripple and speed variations due to the deviation of the electrical angle between stator and rotor magnetic field vectors. There is a need for a motor system and method for its control that reduces or eliminates these shortcomings.

SUMMARY

The present application provides a method and apparatus for improving the commutation response of a PWM controlled electric motor so new phase winding voltage polarities take effect with minimal time delay, reducing torque ripple and speed variation by decreasing the angular deviation of the stator to rotor magnetic field vector relationship from the ideal 90 degrees.

In one aspect, a method of controlling an electronically commutated motor having multiple phase windings by applying PWM drive signals in accordance with a series of commutation states is provided, where a commutation event occurs when a rotor moves from a position associated with one commutation state to a position associated with another commutation state. The method involves the steps of: applying PWM drive signals at a set frequency on a cyclical basis and, responsive to occurrence of a commutation event that is asynchronous with an ongoing PWM drive signal cycle, increasing the frequency of PWM drive signals applied during the ongoing PWM drive signal cycle to reach the end of the ongoing PWM drive signal cycle more quickly than without such a frequency increase.

DETAILED DESCRIPTION

Commutation response in an electronically commutated motor is improved by increasing the PWM drive signal frequency immediately after a commutation event, thereby reducing the time spent at voltage connection polarities from the previous state and maintaining a more uniform average voltage across the commutated phase windings.

In the prior art delayed systems described above, applied torque is reduced during the time between an asynchronous commutation event and when a response occurs as the angle between the rotor and stator flux vectors is decreasing from 60 degrees to zero and a significant increase in winding current results from the rapidly decreasing back EMF. After a delayed response, the ability to inject current in the next commutation state winding connection is reduced because the generated back EMF is rapidly increasing. The reduced current injection causes lower torque production because of reduced current at the ideal 90 degrees torque angle. The commutation delay becomes increasingly significant at higher rotational speeds with higher pole count motors. To illustrate this condition, each commutation state of an 8 pole motor running at 7000 RPM is approximately 360 microseconds while the delay of one period of 20 kHz PWM drive signal frequency is 50 microseconds.

Figure 1:
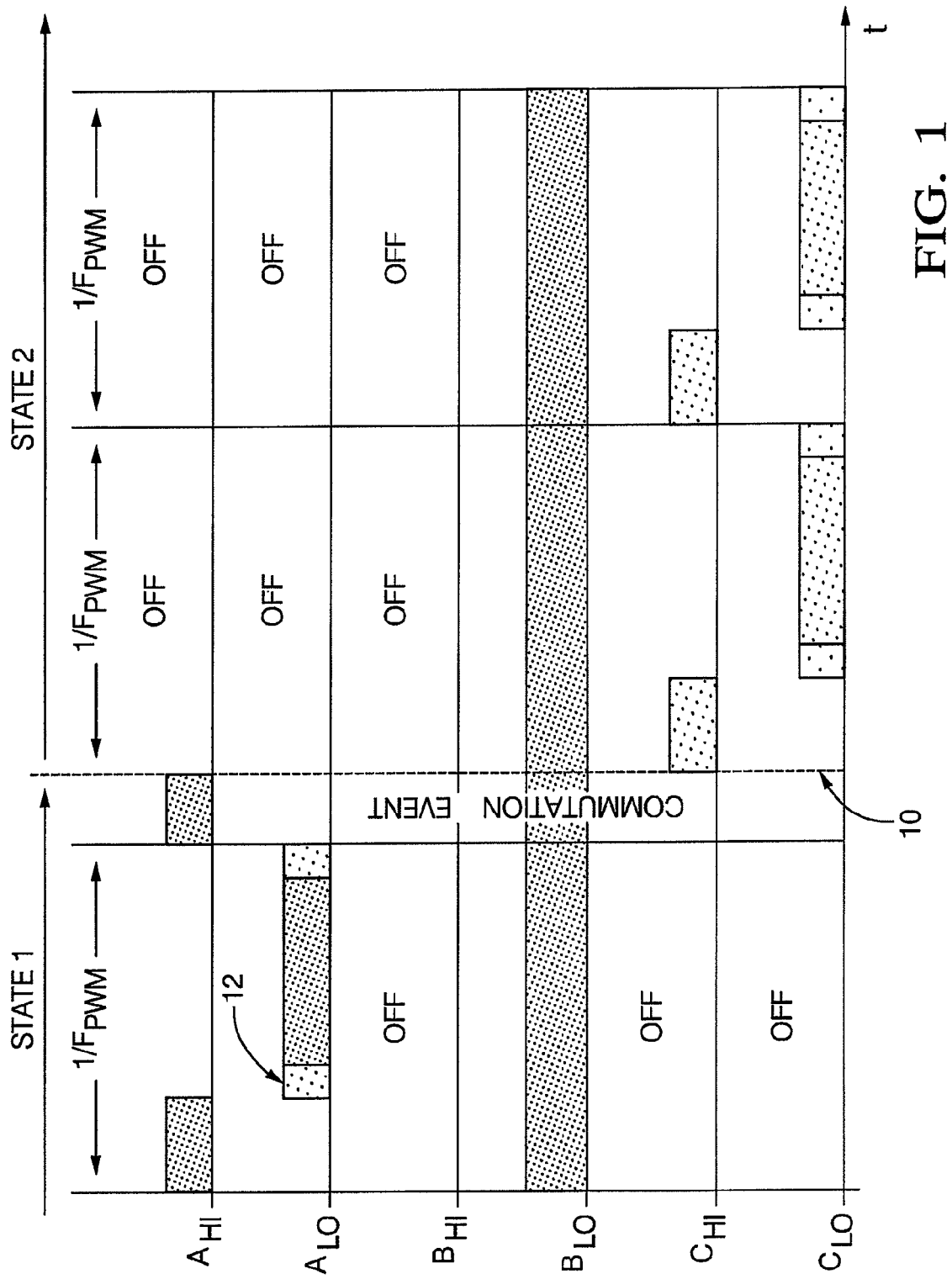
FIG. 1 is a timing diagram illustrating ideal commutation.
Figure 2:
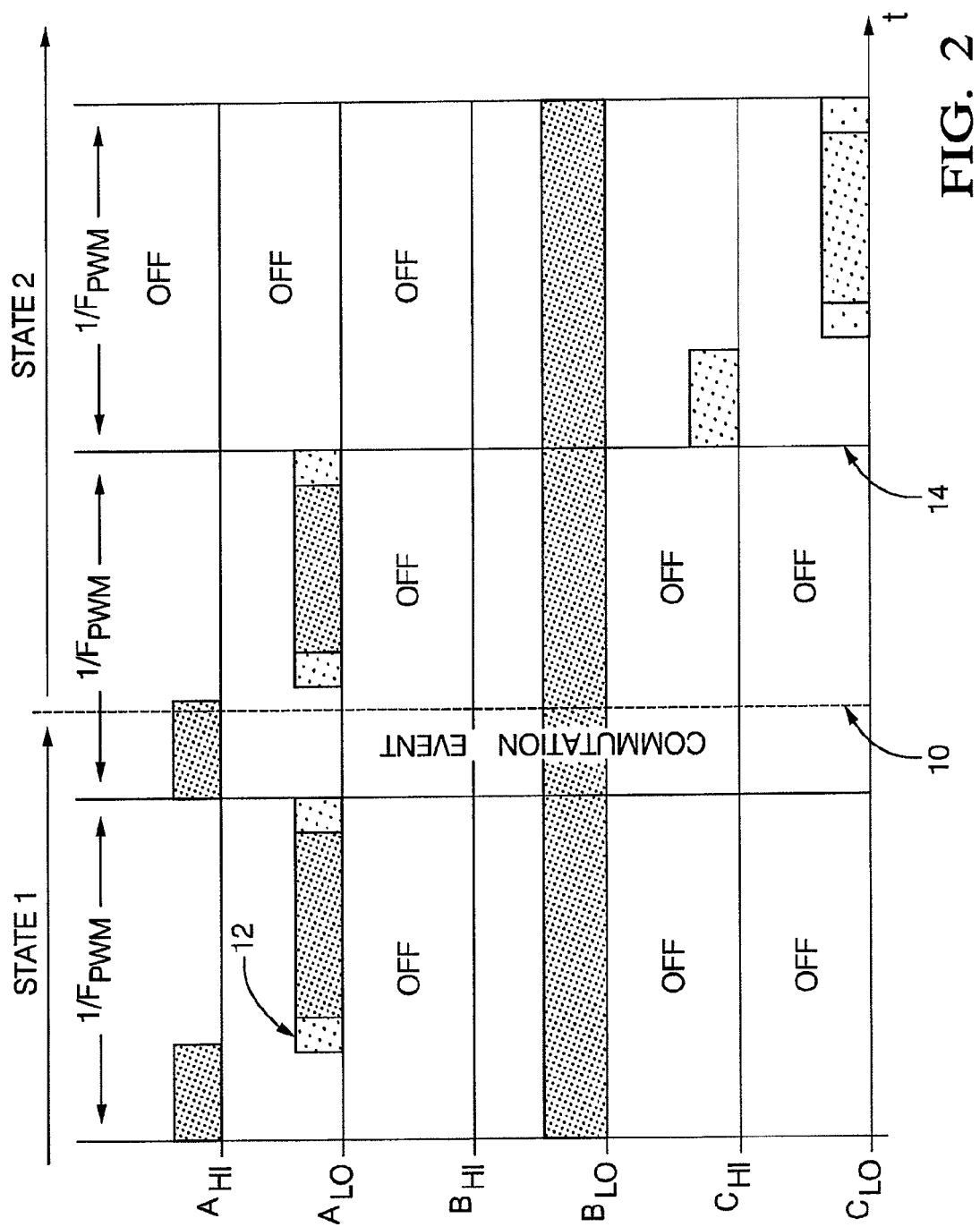
FIG. 2 is another timing diagram illustrating the conventional delayed response in commutation.
Figure 3:
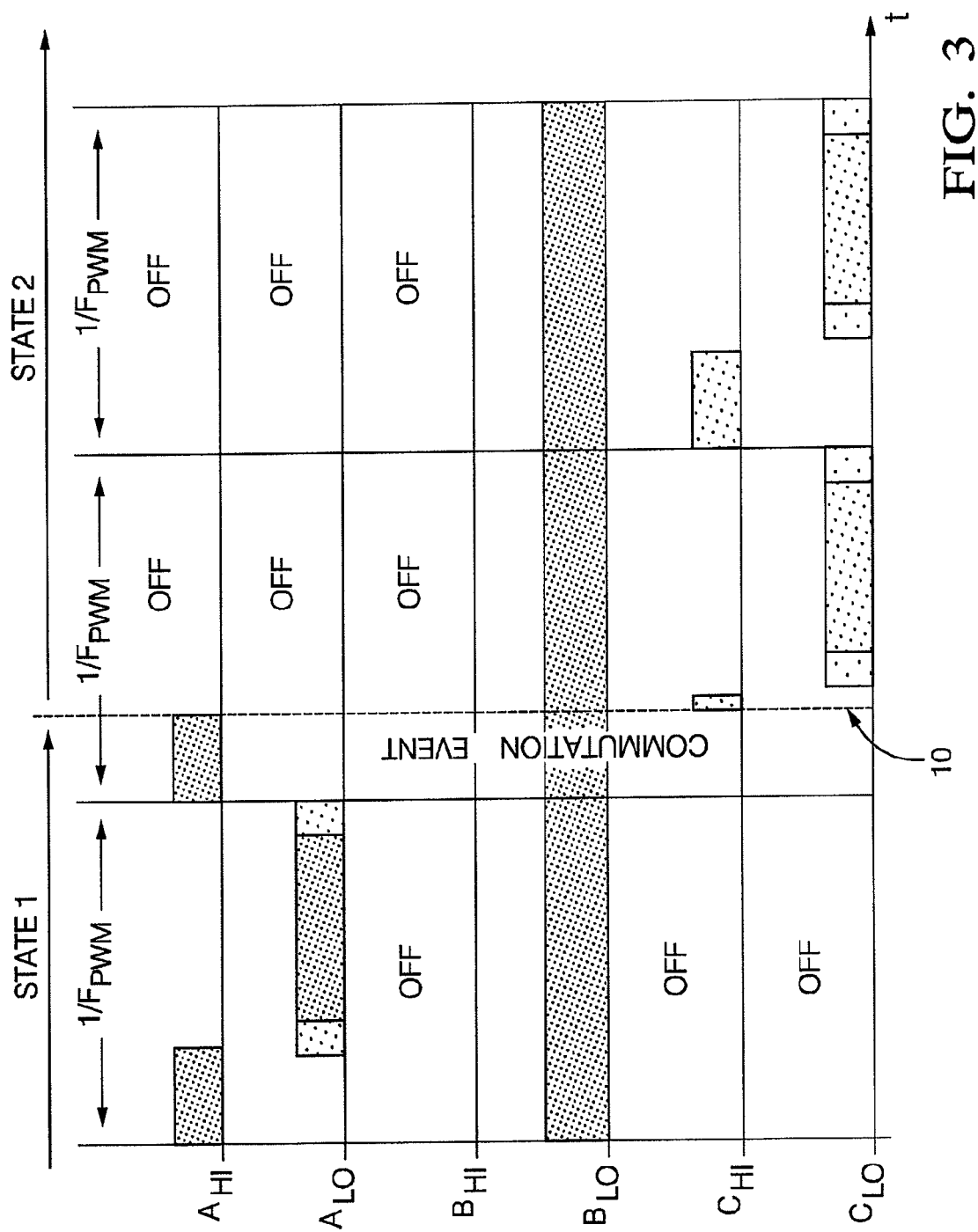
FIG. 3 is another timing diagram illustrating a known commutation technique that results in an incorrect duty cycle being applied during a new commutation state.
Figure 4:
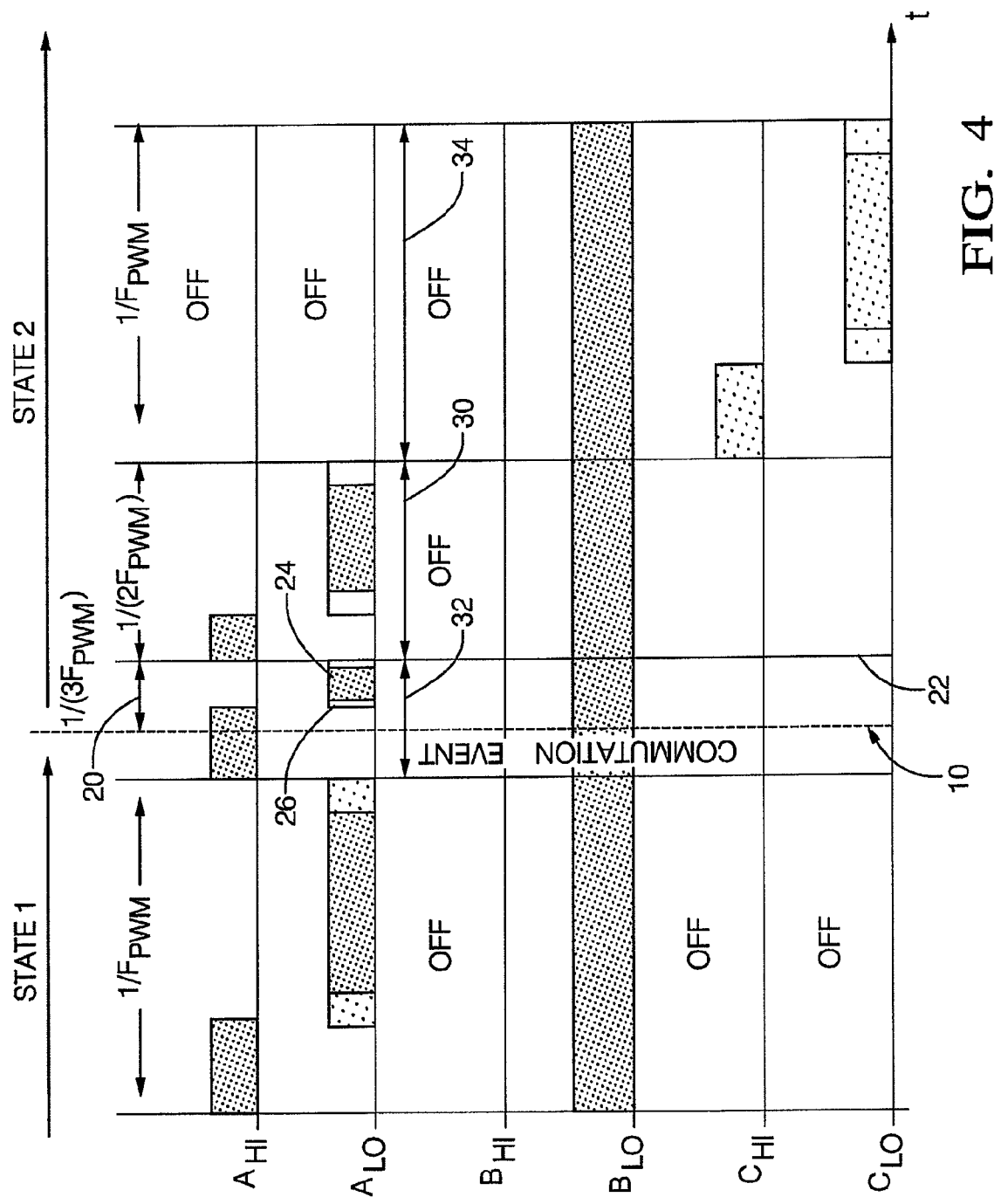
FIG. 4 is another timing diagram illustrating an embodiment of a technique for improving commutation response.

Referring to the timing diagram of FIG. 4, an improved method of commutation in a three phase motor system is shown in response to commutation event 10 that is asynchronous to an ongoing PWM drive signal cycle 32. The standard PWM drive signal frequency $F_{PWM}$ is increased to $3F_{PWM}$, as shown at 20, until the end of the ongoing PWM drive signal cycle at 22. The existing voltage connections are maintained until the end of this PWM drive signal cycle due to particular hardware limitations, and the increase in frequency allows the ongoing PWM drive signal cycle to complete more quickly.

In some implementations, connection of the phase A terminal to negative voltage as shown at 24 may also be eliminated if hardware restrictions are such that application of the necessary dead-time 26 cannot be guaranteed.

For applied winding voltages controlled by PWM duty cycle generation, an additional PWM drive signal cycle 30, here shown at $2F_{PWM}$, may be required to assure new duty cycle values are loaded into the controller to apply the desired voltage to the next commutation state winding connection. In this embodiment, the commutation event 10 occurs during ongoing PWM drive signal cycle 32, and the particular hardware implementation requires a full PWM drive signal cycle before the controller registers new duty cycle values for the next commutation state winding connection. After PWM drive signal cycle 30 is complete, the PWM drive signal frequency returns to $F_{PWM}$ as shown by cycle 34. Thus, new phase winding voltage polarities take effect with reduced time delay, reducing torque ripple and speed variation.

Figure 5:
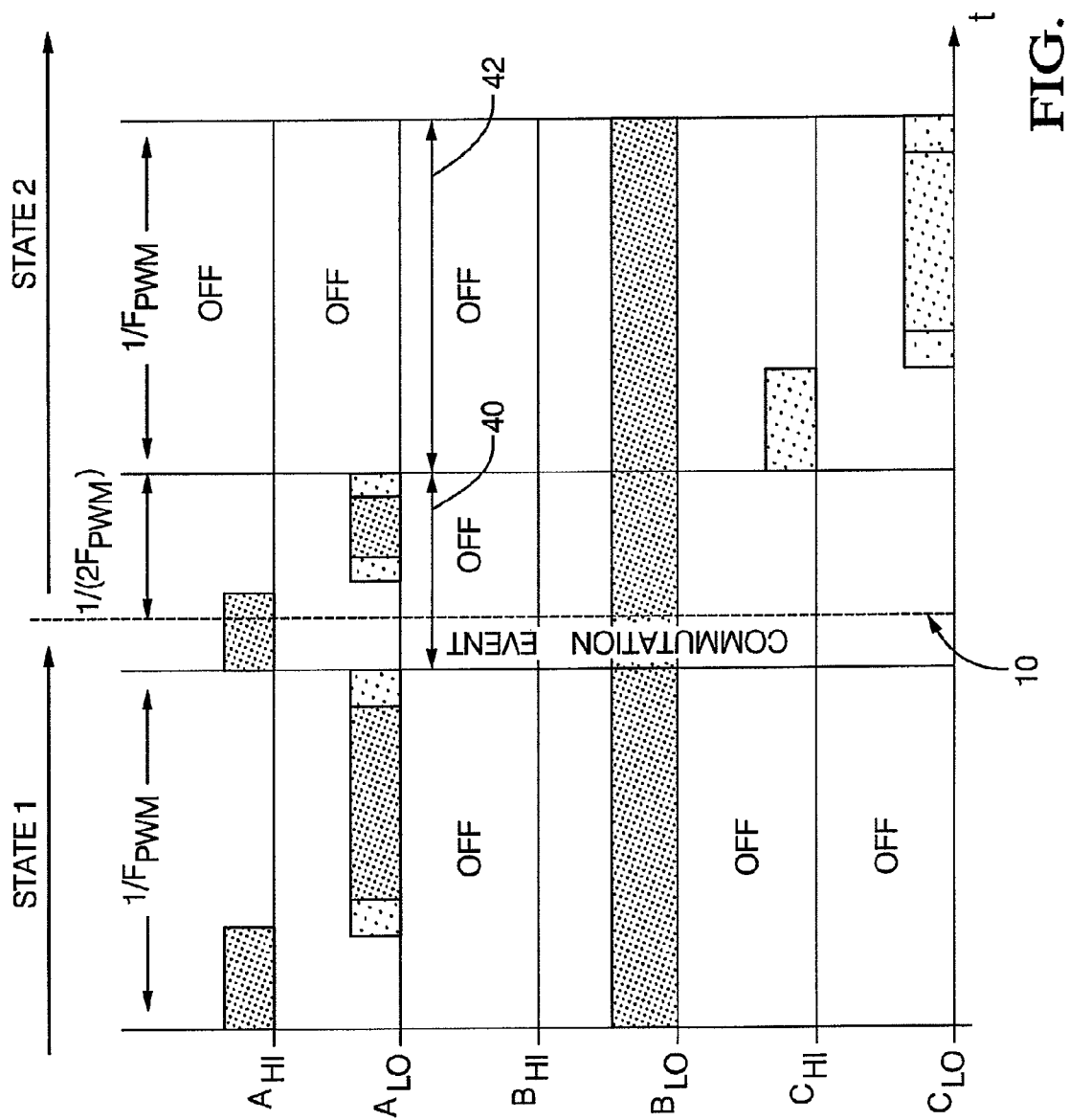
FIG. 5 is another timing diagram illustrating a second embodiment of a technique for improving commutation response.

Referring to the timing diagram of FIG. 5, an alternative improved method of commutation response to commutation event 10, which is asynchronous with ongoing PWM drive signal cycle 40, involves increasing the PWM drive signal frequency from $F_{PWM}$ to $2F_{PWM}$ until reaching the end of the ongoing PWM drive signal cycle 40. The existing voltage connections are maintained until the end of cycle 40, and thus the transition to PWM cycle 42 occurs more quickly than without such a frequency increase. Note that drive signal frequency reverts to $F_{PWM}$ in cycle 42. Thus, new phase winding voltage polarities take effect with reduced time delay, reducing torque ripple and speed variation.

Referring to the timing diagrams of FIGS. 4 and 5, the objective is to obtain the maximum PWM drive signal frequency increase permitted by the power stage dead-time and switching limitations to reduce the delay after a commutation event 10. The frequency increase may be an integer or non-integer multiple of the original PWM drive signal frequency. Hardware implementation limitations for a particular embodiment should be considered such that the previous commutation state winding voltage is removed as quickly as possible and the next commutation state winding voltage is completely applied to all phases as quickly as possible. One or more intermediate decreases in PWM drive signal frequency may be required to insure that the PWM drive signals for all phases are properly updated. The PWM drive signal frequency should return to the original PWM drive signal frequency once the applied winding voltage transition in response to commutation event 10 has been completed.

Figure 6B:
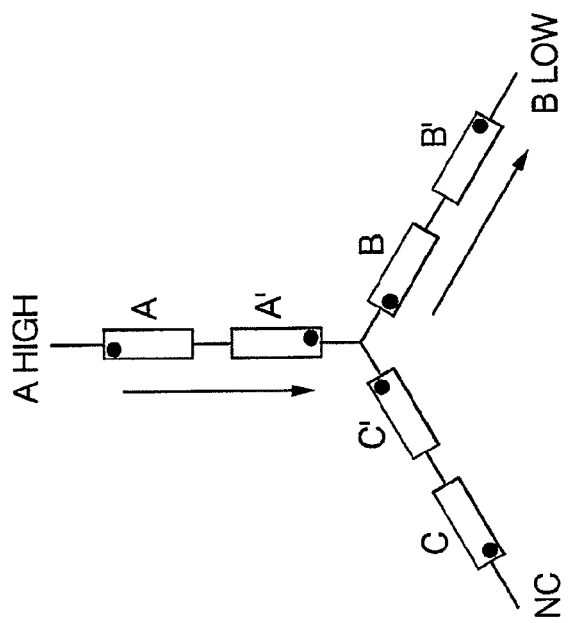
FIG. 6 is a diagrammatic view of a three phase motor.
Figure 6A:
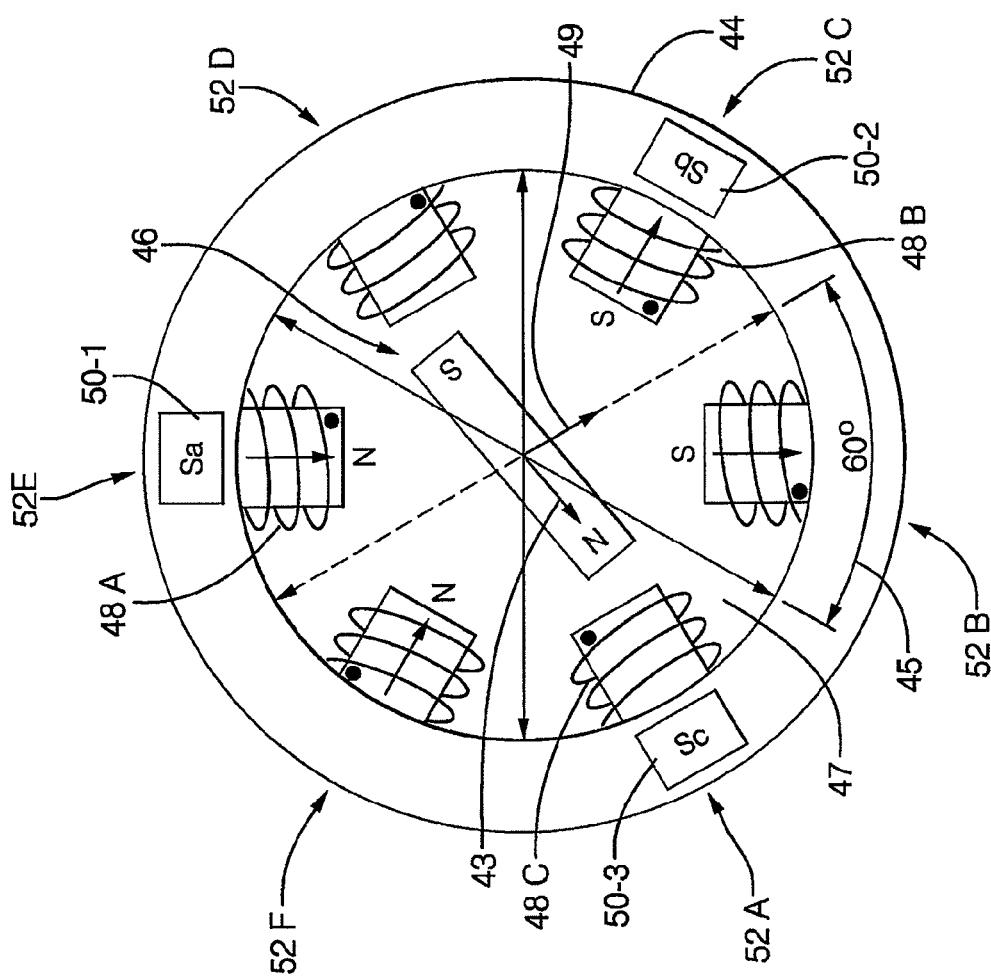
Figure 7B:
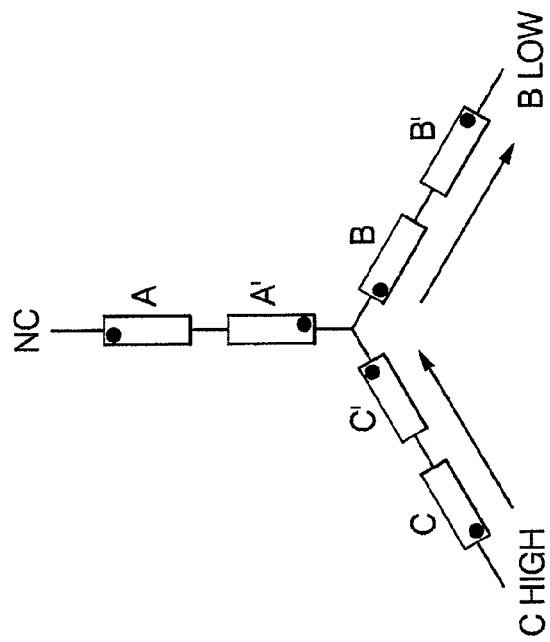
FIG. 7 is another diagrammatic view of the three phase motor.
Figure 7A:
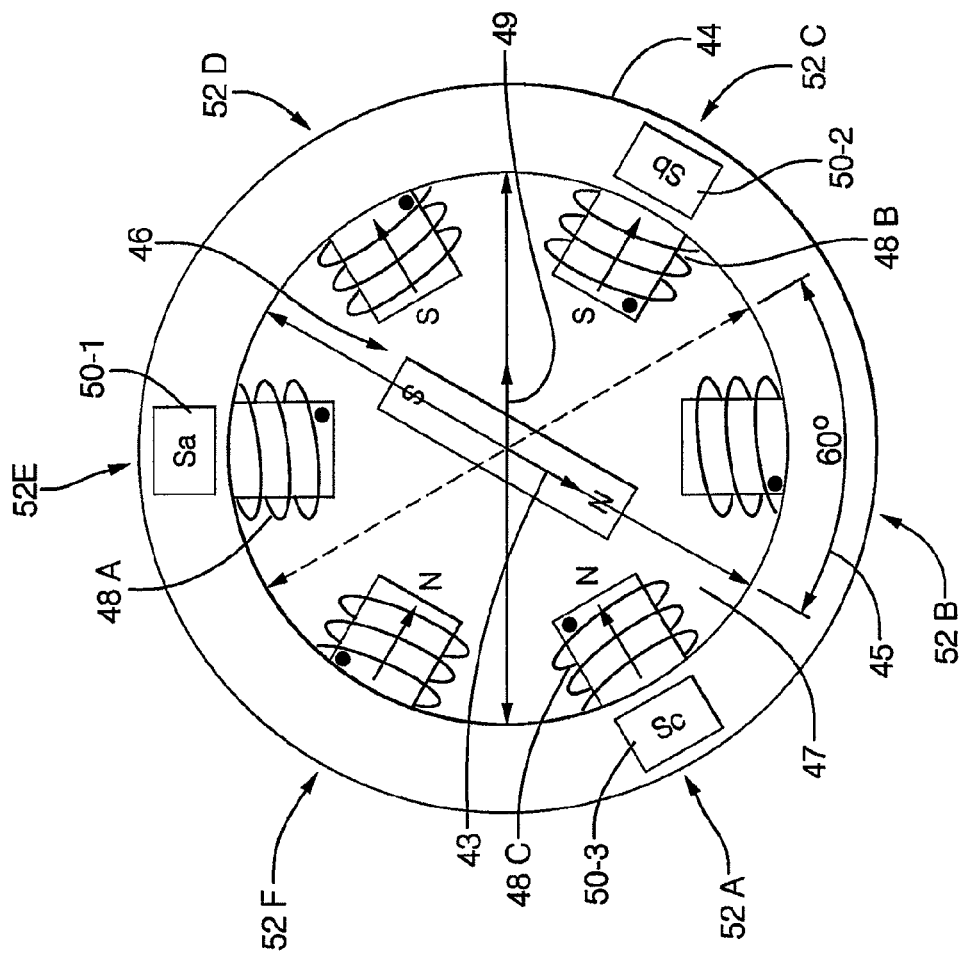

Referring to FIGS. 6 and 7, an exemplary three phase motor 44 has a magnetic rotor 46, shown in this embodiment having N (positive) and S (negative) poles. The motor 44 has a stator with three phase windings 48A (made up of A and A'), 48B (made up of B and B') and 48C (made up of C and C'), surrounded by a sensor arrangement including three Hall effect sensors 50-1, 50-2 and 50-3.

The three phase motor has six commutation states 52A, 52B, 52C, 52D, 52E and 52F, each commutation state comprising a 60 degree sector 45 of a circle representing rotation of the three phase motor 44 magnetic rotor 46. Arrows originating from the center of FIGS. 6 and 7 represent the location of commutation events 47 between adjacent sectors 45. In this embodiment, the three phase motor 44 has three phase windings 48A, 48B and 48C, which can be configured in a wye (Y) configuration, delta (Δ) configuration or any other suitable configuration. Other numbers of phase windings can also be used.

The magnetic rotor 46 is driven by connecting the phase windings 48A, 48B and 48C to a positive voltage (V+), a negative voltage (V−) or no voltage (NC). Each of the Hall effect sensors 50-1, 50-2 and 50-3 is either triggered (e.g., closed) or not triggered (e.g., opened) depending upon the position of the magnetic rotor 46. The phase windings 48A, 48B and 48C are energized in a predetermined sequence utilizing PWM drive signals for the sectors 45 corresponding with each of the six commutation states 52A, 52B, 52C, 52D, 52E and 52F. Table I below illustrates an exemplary energizing sequence for the motor 44 of FIGS. 6 and 7. For Hall effect sensors 50-1, 50-2 and 50-3, a "1" indicates a triggered sensor and a "0" indicates a non-triggered sensor. For the phase windings 48A, 48B and 48C, NC indicates no voltage connection, V+ indicates a positive voltage connection and V− indicates a negative voltage connection.

FIG. 6 shows the motor during commutation State 52A with the rotor magnetic flux vector 43 and resultant stator magnetic flux 49 vector at less than a 90 degree angle for the rotor position shown. In FIG. 6 the resultant stator magnetic flux vector 49 is produced by the combined effect of the magnetic flux from A to A' and the magnetic flux from B' to B. FIG. 7 shows the motor during commutation State 52B with the magnetic flux vector 43 and resultant stator magnetic flux 49 vector less than 120 degrees for the rotor position shown. In FIG. 7 the resultant stator magnetic flux vector 49 is produced by the combined effect of the magnetic flux from C to C' and the magnetic flux from B' to B.

acts as an interrupt to the controller, causing the controller to increase the frequency of the ongoing PWM drive signal. In another embodiment, the controller may analyze the sensor output to identify if the commutation event is asynchronous to an ongoing PWM drive cycle and, if so, modifies the PWM frequency in a manner such as those illustrated in FIG. 4 or FIG. 5, thereby improving the commutation response. Other variations on the manner of increasing the frequency of the PWM signals upon the occurrence of asynchronous commutation events are possible. The controller 58 adjusts the frequency of the PWM drive initiation signals 59 it sends to the gate drives 60, resulting in a corresponding frequency change in the PWM drive signals 63 applied to the motor phase windings. The PWM drive initiation signals 59, and thus the PWM drive signals 63, are later returned to a standard frequency per FIGS. 4 and 5. The temporary frequency increase may be repeated for each asynchronous commutation event.

Figure 9:
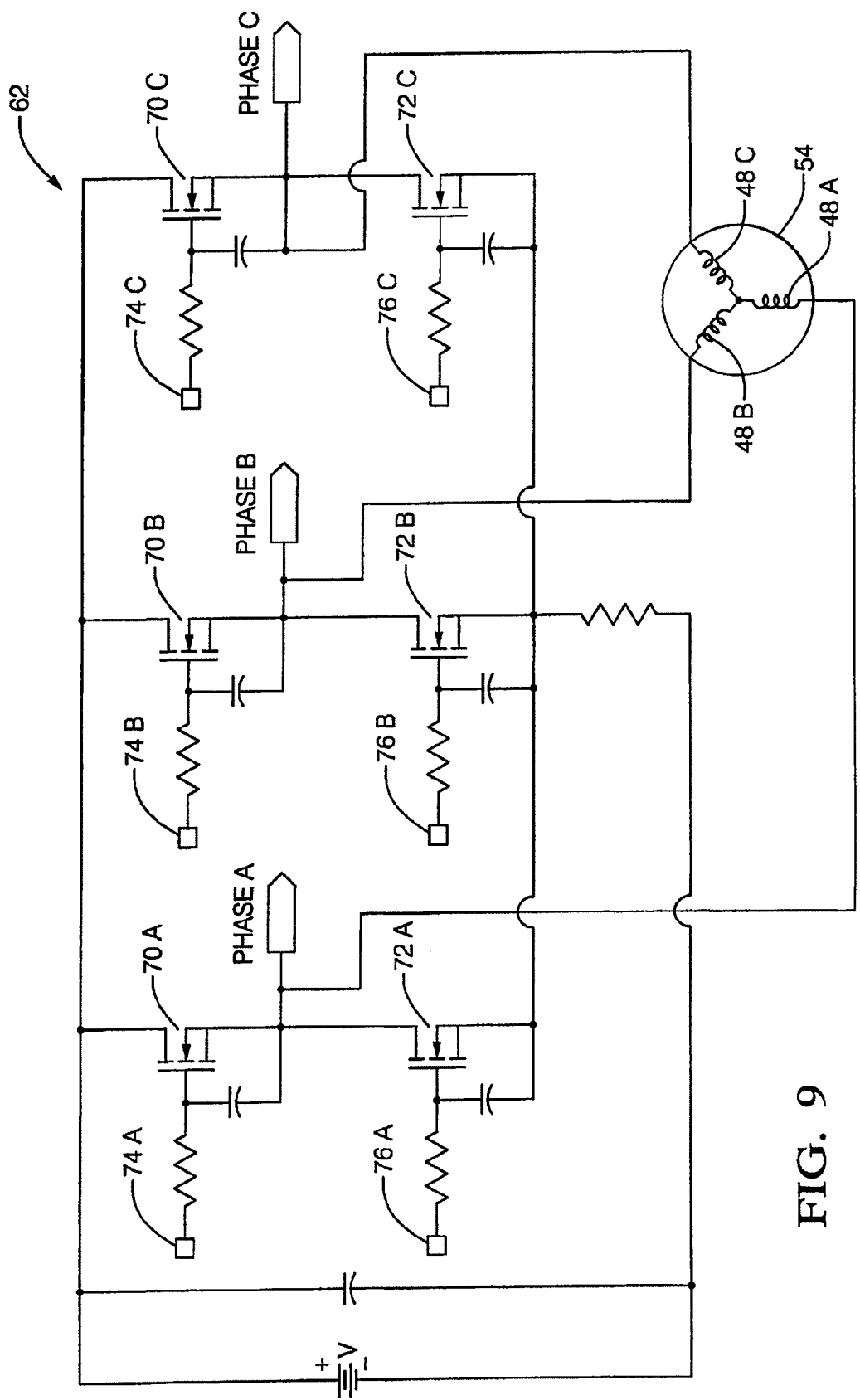
FIG. 9 is a schematic diagram of a three phase motor control system circuit.

FIG. 9 is a schematic diagram of a circuit showing electronic switching devices 62 of the control system as connected to motor 54. Each phase winding 48A, 48B and 48C has a corresponding HI side electronic switching device (e.g., at the positive voltage side of the voltage source) 70A, 70B and 70C and LO side electronic switching device (e.g., at the negative side of the voltage source) 72A, 72B and 72C, respectively. The gate drives (not shown) step up the voltage of the PWM drive initiation signals, then apply the increased

TABLE I

Exemplary PWM Drive Signal Sequence

| Communication State | Hall Effect Sensor 50-1 | Hall Effect Sensor 50-2 | Hall Effect Sensor 50-3 | Phase Winding 48A | Phase Winding 48B | Phase Winding 48C |
|---|---|---|---|---|---|---|
| 52A | 0 | 0 | 1 | V+ | V− | NC |
| 52B | 0 | 1 | 1 | NC | V− | V+ |
| 52C | 0 | 1 | 0 | V− | NC | V+ |
| 52D | 1 | 1 | 0 | V− | V+ | NC |
| 52E | 1 | 0 | 0 | NC | V+ | V− |
| 52F | 1 | 0 | 1 | V+ | NC | V− |

During each commutation state, one phase winding 48A, 48B or 48C has a positive voltage, one phase winding has a negative voltage, and one phase winding is off. Thus, the attracting and repelling magnetic flux vectors caused by energizing phase windings 48A, 48B and 48C drive rotation of the magnetic rotor 46.

Figure 8:
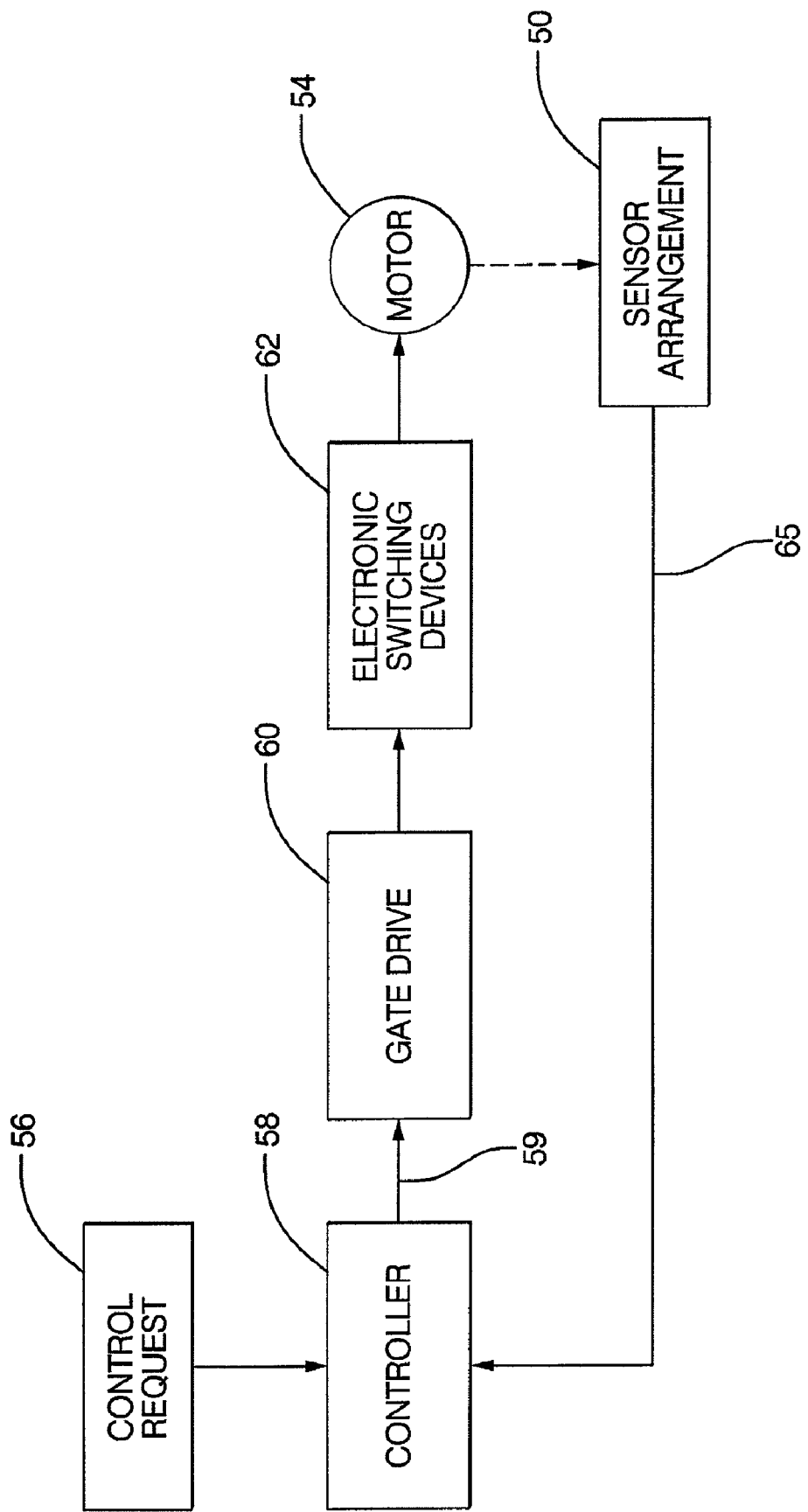
FIG. 8 is a block diagram illustrating a motor control system.

FIG. 8 is a block diagram of an exemplary motor control system having a motor 54 with a magnetic rotor. Control requests 56 arrive at controller 58 (e.g., requesting a specific speed of operation for the motor 54). The controller 58 sends one or more PWM drive initiation signals 59 at a standard frequency to one or more gate drives 60. The gate drives 60 then step up the signal voltage to a level sufficient to effectively operate switching devices 62 associated with the motor phase winding terminals. For instance, the controller 58 may send PWM drive initiation signals 59 at 0-5V, which the gate drives 60 will then increase to 0-15V. Operation of the electronic switching devices 62 produces PWM drive signals 63 that energize the phase windings with the appropriate voltage (positive, negative or no voltage).

Sensor arrangement 50 detects commutation events as they occur. When a new commutation event occurs due to magnetic rotor rotation, the sensor output from the sensor arrangement 50 to the controller 58 changes (see Table I). In one embodiment, a change in output from the sensor arrangement voltage signals to the electronic switching devices 62 via circuit inputs 74A, 74B, 74C, 76A, 76B and 76C.

It is to be clearly understood that the above description is intended by way of illustration and example only and is not intended to be taken by way of limitation. For example, why FIGS. 6 and 7 depict an embodiment implemented in a rotary motor, such as a brushless direct current motor or a switched reluctance motor, the PWM frequency control technique described above could readily implemented on any electronically commutated motor, including linear motors. Further, the exact level of frequency increase and manner of implementation could vary widely depending upon the specific implementation. Other changes and modifications could also be made.

What is claimed is:

1. A method of controlling an electronically commutated motor having multiple phase windings by applying PWM drive signals in accordance with a series of commutation states, where a commutation event occurs when a rotor moves from a position associated with one commutation state to a position associated with another commutation state, the method comprising the steps of:

(a) applying PWM drive signals at a set frequency on a cyclical basis;

(b) detecting a commutation event that is asynchronous with and occurs during an ongoing PWM drive signal cycle at a set frequency;

(c) responsive to detection of the asynchronous commutation event in step (b), increasing frequency of PWM drive signals applied during the ongoing PWM drive signal cycle to a frequency above the set frequency in order to reach the end of the ongoing PWM drive signal cycle more quickly than without such a frequency increase.

2. The method of claim 1, wherein in step (c), the frequency of PWM drive signals applied during the ongoing PWM drive signal cycle is increased to an integer multiple of the set frequency.

3. The method of claim 1, wherein in step (c), the frequency of PWM drive signals applied during the ongoing PWM drive signal cycle is increased to a non-integer multiple of the set frequency.

4. The method of claim 1, wherein the set frequency is X, the increased frequency of step (b) is Y, and at the end of the ongoing PWM drive signal cycle at frequency Y, frequency of PWM drive signals reverts back to frequency X for the next PWM cycle.

5. The method of claim 1 wherein the electronically commutated motor is one of a rotory motor or a linear motor.

6. A motor arrangement including the electronically commutated motor of claim 1, comprising:

a motor control system associated with the electronically commutated motor of claim 1 and operating to carry out method steps (a), (b), and (c) of claim 1.

7. A motor control system comprising:

a motor having multiple phase windings and a movable rotor, the position of the rotor defines multiple commutation states for the phase windings;

a sensor arrangement for indicating the occurrence of commutation events when the rotor moves from a position associated with one commutation state to a position associated with another commutation state; and a controller for selectively energizing the phase windings with PWM drive signals, the controller operatively connected with the sensor arrangement and operable, upon occurrence of a commutation event that is asynchronous to an ongoing PWM drive signal of an initial frequency to increase frequency of the ongoing PWM drive signal to a frequency above the initial frequency in order to reach an end of cycle for the ongoing PWM drive signal more quickly than without such a frequency increase.

8. The motor control system of claim 7, wherein the initial frequency of the ongoing PWM drive signal is X, the increased frequency of the ongoing PWM drive signal is Y, and at the end of cycle of the ongoing PWM drive signal, the controller reverts back to frequency X for a next PWM cycle.

* * * * *